J. Fallows,
Spoon.
No. 54,516.     Patented May 8, 1866.
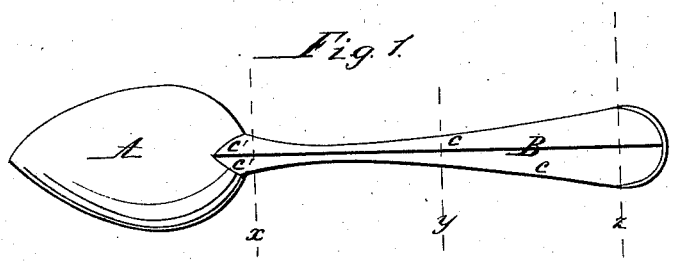
Fig. 1.
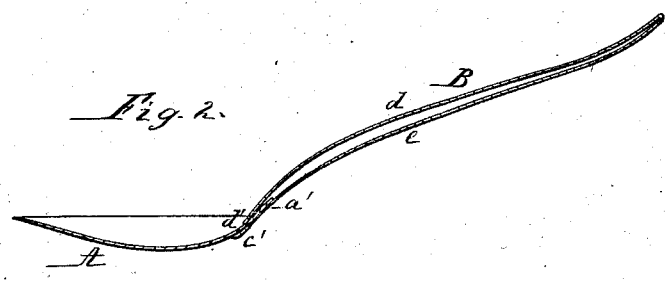
Fig. 2.
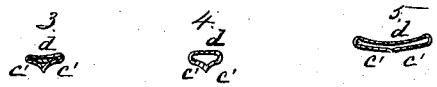
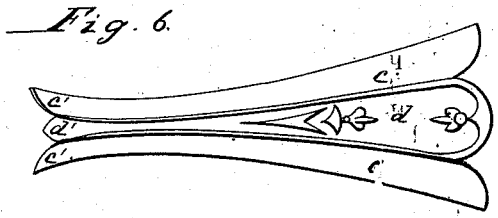
Fig. 6.
Witnesses:
Benj. Morrison
R. F. Shattuck
Inventor:
James Fallows

UNITED STATES PATENT OFFICE.

JAMES FALLOWS, OF PHILADELPHIA, PENNSYLVANIA.

IMPROVEMENT IN SHEET-METAL SPOONS.

Specification forming part of Letters Patent No. 54,516, dated May 8, 1866.

*To all whom it may concern:*

Be it known that I, JAMES FALLOWS, of the city of Philadelphia, in the State of Pennsylvania, have invented a new and useful Improvement in the Manufacture of Sheet-Metal Spoons; and I do hereby declare that the following is a full, clear, and exact description of the construction of the same, reference being had to the accompanying drawings, making a part of this specification, in which—

Figure 1 is a representation of the under side of the said improved spoon; Fig. 2, a central longitudinal vertical section of the same; Figs. 3, 4, 5, transverse sections on the respective dotted lines $x$ $y$ $z$ of Fig. 1, and Fig. 6 a plan view of the sheet-metal blank for the handle, like letters of reference indicating the same parts when in the different figures.

The object of my improvement is to produce a sheet-metal spoon having a handle so constructed as to cheapen the cost of such spoons and at the same time afford a stronger and better article.

My invention consists in making a hollow handle for a sheet-metal spoon by cutting or punching out a blank from a plate of the sheet metal, forming it up, and finishing it in connection with the bowl, substantially as hereinafter described and set forth.

In the drawings, A is the bowl of the spoon, and B the hollow handle.

The blank, Fig. 6, for the handle B is cut or punched out of the plate of sheet metal (generally tin-plate) so as to be of the exterior form or shape shown in the figure. The two outer sides, $c$ $c$, are now bent by means of suitable forming-dies so as to come opposite to the middle portion, $d$, and with their side edges abutting together from end to end of the blank, thus bringing it substantially into the closed form shown in the other figures. It is then adjusted in connection with the bowl A, the latter having in this instance a short stem, $a'$, (see Fig. 2,) which enters that end of the handle, and, together with the lapping jaws $c'$ $c'$ $d'$ of the latter, holds the two parts A and B tightly together. The whole is now shaped and compressed in a suitable finishing-die, and finally passed through a bath of melted tin, which solders all the joints together and gives to the spoon the requisite finish.

If ornamental figures are desired on the handles they are very readily produced on the blank before it is bent, as represented in Fig. 6, by pressure in an ornamented die.

The bowl A and handle B may be cut together as one blank; but the making them of separate pieces, as shown in the drawings, affords a stronger spoon, and is therefore preferred.

It will be seen that this is a simple, cheap, and expeditious mode of manufacturing a sheet-metal spoon, and that the handle being hollow and formed so as to present a stiffening joint or ridge along in the middle of its under side, lightness is attained, while its strength is more than sufficient for all the legitimate purposes to which sheet-metal spoons are applied.

Having thus fully described my improvement, what I claim as new, and desire to secure by Letters Patent, is—

A sheet-metal spoon having a hollow handle constructed of a single piece of the sheet metal, substantially as herein described and set forth, for the purposes specified.

JAMES FALLOWS.

Witnesses:
BENJ. MORISON,
B. F. SHATTUCK.